US006557727B1

(12) United States Patent
Robertson

(10) Patent No.: US 6,557,727 B1
(45) Date of Patent: May 6, 2003

(54) LUG NUT MAGAZINE

(75) Inventor: Warren A. Robertson, Port Richey, FL (US)

(73) Assignee: Warren F. Robertson, Mooresville, NC (US)

(*) Notice: Subject to any disclaimer, the term of this patent is extended or adjusted under 35 U.S.C. 154(b) by 5 days.

(21) Appl. No.: 10/011,082

(22) Filed: Dec. 7, 2001

(51) Int. Cl.[7] ................................................ B65G 59/00
(52) U.S. Cl. ........................................ 221/278; 81/124.1
(58) Field of Search ................................ 221/197, 278, 221/268, 238; 81/121.1, 124.1, 125

(56) References Cited

U.S. PATENT DOCUMENTS

| | | | |
|---|---|---|---|
| 1,543,175 | A | 6/1925 | McCarthy |
| 2,412,275 | A | 12/1946 | Klopovic |
| 2,493,398 | A | 1/1950 | Fricke |
| 2,611,289 | A | 9/1952 | Frank |
| 2,896,489 | A | 7/1959 | Madsen |
| 3,005,367 | A | 10/1961 | Vose |
| 4,976,174 | A | 12/1990 | Walsh |
| 5,396,819 | A | 3/1995 | Bradley |
| 5,551,321 | A | 9/1996 | Bottiglieri |
| 5,640,889 | A | 6/1997 | Anderson |
| D411,723 | S | 6/1999 | Lamerrill |

*Primary Examiner*—Kenneth W. Noland
(74) *Attorney, Agent, or Firm*—Adams, Schwartz & Evans, P.A.

(57) ABSTRACT

A lug nut dispenser including a housing having an interior wall defining an elongate chamber for receiving lug nuts therein, an exterior wall, an upstream end for releasably receiving a drive impact tool, and a downstream end defining a port communicating with the chamber for permitting consecutive release and ejection of the lug nuts therethrough. A displacer ring is carried on the exterior walls of the housing and slides relative thereto. A displacer is connected to the ring and extends through a slot defined by and extending through the housing into the chamber. The displacer slides along the slot for moving the nuts downstream. The displacer includes a shoulder for engaging a nut positioned in the chamber for permitting sequential, axially-aligned movement of the nuts through the chamber. There are also at least two spaced-apart, flexible detent arms. Each arm has first and second ends. The second end includes a tip and is moveable between nut-retaining and nut-dispensing positions.

9 Claims, 4 Drawing Sheets

LUG NUT MAGAZINE

TECHNICAL FIELD AND BACKGROUND OF THE INVENTION

This invention relates to a lug nut magazine that is used with a drive impact tool to mount and remove lug nuts from the wheel hubs of an automobile or other wheeled vehicle. Although the magazine may be used under any circumstances in which a user needs to change a tire on a vehicle, the magazine is ideally suited for use in those instances in which one or more tires must be quickly changed, such as during a pit stop made during a road or track race.

Individuals who must change a tire under race conditions are faced with the challenge of loosening the lug nuts on the studs of a wheel well, raising the tire off of the ground, removing the lug nuts from the studs, ensuring that the removed nuts are corralled and not lost, replacing the tire, retrieving the lug nuts, replacing and tightening the lug nuts on the studs, and then lowering the new tire back onto the ground—all in error-free, rapid succession. Given the number of steps involved and short period of time available, this task is virtually impossible to execute without mechanical assistance. While prior art devices exist which permit a user to quickly remove, replace, and store lug nuts during the tire-changing process, such devices lack the internal components necessary to make such a high-speed process run smoothly. Specifically, such devices lack sufficient stabilizing features to ensure that the lug nuts are received within and dispensed from the device in a controlled, yet rapid manner, and do not prevent the lug nuts from jamming within and destroying the operability of the device.

The present invention solves these problems by providing a lug nut magazine having unique, internal detent and guide structures that cooperate with an internal displacer which is connected to and moved by an external displacer ring for allowing lug nuts to slide smoothly through the interior of the magazine. The magazine of the present invention does not require the use of compression springs or ball bearings. Furthermore, unlike prior art devices which often require multiple release mechanisms to be simultaneously, identically manipulated for the device to function properly, removal of lug nuts from the present invention is achieved by simply urging the external displacer ring toward the open end of the magazine. The lug nut magazine of the present invention offers a reliable removal, storage, and dispensing device that permits its user to rapidly change a tire without losing the lug nuts, having to dislodge nuts jammed within the device, or having to resort to time-consuming, manual installation of the lug nuts.

SUMMARY OF THE INVENTION

Therefore, it is an object of the present invention to provide a lug nut magazine adapted for use with a drive impact tool that permits rapid removal and replacement of lug nuts positioned on the studs of a wheel hub.

It is another object of the present invention to provide a lug nut magazine that includes an internal chamber having features which prevent lug nuts stored therein from jamming as they are positioned within and dispensed from the chamber.

It is another object of the invention to provide a lug nut magazine that includes uniquely-shaped detent arms that maintain lug nuts within the magazine in the absence of pressure on an externally-located dispenser ring, which in turn causes movement of the nuts toward the dispensing end of the magazine.

It is another object of the invention to provide a lug nut magazine that is formed from readily available materials and components which are easy and relatively inexpensive to manufacture and supply.

These and other objects of the present invention are achieved in the preferred embodiments disclosed below by providing a lug nut dispenser adapted for use with a drive impact tool for mounting and removing a plurality of lug nuts from a wheel hub. The dispenser has a housing including interior and exterior walls. The interior wall defines an elongate chamber adapted for receiving the lug nuts therein. The housing also has an upstream end adapted for releasably receiving the drive impact tool, and a downstream end defining a port communicating with the chamber for permitting consecutive release and ejection of the lug nuts therethrough. A displacer ring is carried on the exterior wall of the housing and is adapted for sliding movement relative thereto. A displacer is connected to the displacer ring and extends through a slot defined by and extending through the housing and into the elongate chamber. The displacer is adapted for sliding movement along the slot relative to the chamber for moving the nuts in a downstream direction in response to movement of the displacer ring. The displacer includes a radially and inwardly-extending shoulder for engaging adjacent radially and inwardly-extending faces of a nut positioned in the chamber for providing a first stabilizing surface for permitting sequential, axially-aligned movement of the nuts through the chamber. The lug nut dispenser also includes at least two spaced-apart, flexible detent arms. Each of the detent arms has a first end connected to the interior wall and a second end extending away from the first end and toward the downstream end of the housing. The second end includes an inwardly-extending tip and is movable between a nut-retaining position wherein the inwardly-extending tip engages and retains the nut within the chamber in the absence of movement of the nuts toward the downstream end, and a nut-dispensing position, wherein the dispenser urges the nuts toward the downstream end to cause the second end of the detent arm to move away from the nut positioned adjacent the downstream end, thereby releasing the nut and allowing ejection of the nut through the port.

According to one preferred embodiment of the invention, the lug nut dispenser includes at least one inwardly-projecting guide positioned on the interior wall and extending along the length of the chamber between the downstream and upstream ends of the housing. The guide is adapted for engaging a complementary side of the nut for providing a second stabilizing surface for permitting the sequential, axially-aligned movement of the nuts through the chamber.

According to another preferred embodiment of the invention, the lug nut dispenser includes a plurality of spaced-apart, inwardly-projecting guides positioned on the interior wall and extending along the length of the chamber between the downstream and upstream ends of the housing. Each of the guides is adapted for engaging a respective one of a plurality of complementary sides of the nut. The guides cooperate together for collectively providing a second stabilizing surface for permitting the sequential, axially-aligned movement of the nuts through the chamber.

According to yet another preferred embodiment of the invention, there are an odd number of inwardly-projecting guides.

According to yet another preferred embodiment of the invention, there are three inwardly-projecting guides.

According to yet another preferred embodiment of the invention, the first end of each of the detent arms is connected to the interior wall adjacent the upstream end of the housing.

According to yet another preferred embodiment of the invention, the lug nut dispenser includes a radially and outwardly-extending flange formed on a downstream edge of the displacer ring for permitting a user to grasp the displacer ring for urging the displacer ring in the downstream direction, thereby initiating the sequential, axially-aligned movement of nuts through the chamber.

According to yet another preferred embodiment of the invention, the inwardly-extending tip defines a notch having an inwardly-directed face biased towards and engaging the nut positioned adjacent the downstream end of the housing in the absence of movement of the nuts toward the downstream end.

Each of the detent arms is preferably formed from spring steel.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
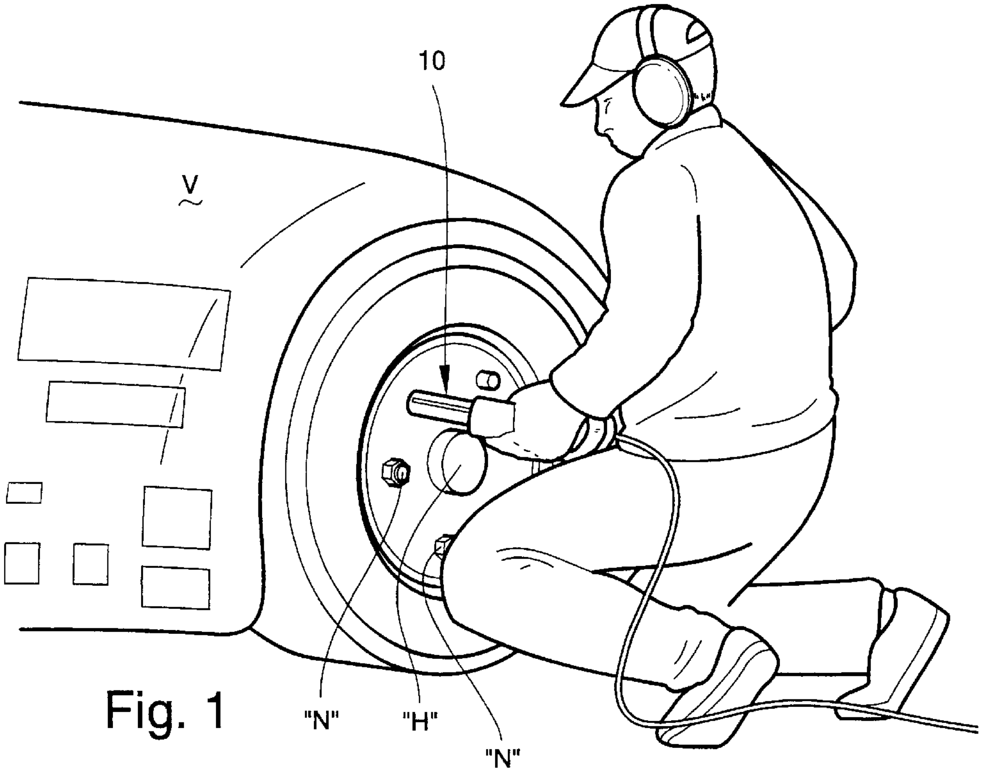
FIG. 1 is an environmental perspective view of a lug nut magazine according to one preferred embodiment of the invention in use with a drive impact tool.

Referring now specifically to the drawings, a lug nut magazine according to a preferred embodiment of the invention is illustrated in FIG. 1 and shown generally at reference numeral 10. The magazine 10 is shown in use with a conventional drive impact tool "T" for connecting lug nuts "N" to the wheel hub "H" of a vehicle "V".

Figure 2:
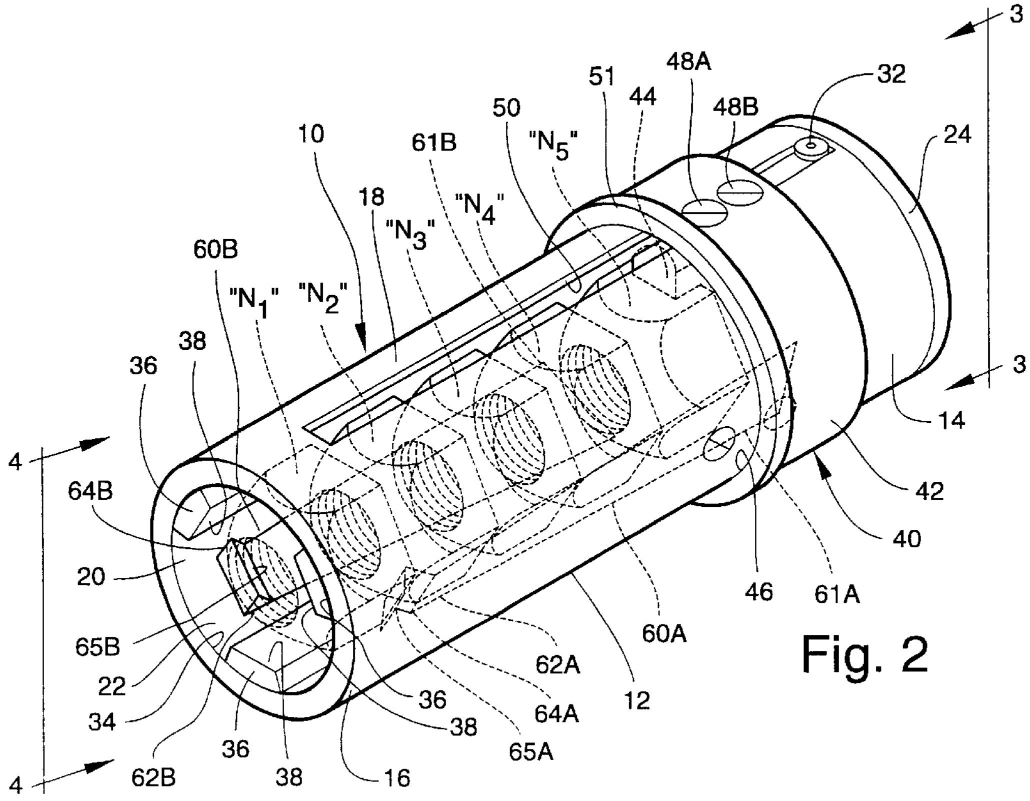
FIG. 2 is a perspective view of a lug nut magazine according to a preferred embodiment of the invention showing the magazine fully loaded with lug nuts.

Referring now to FIG. 2, the magazine 10 is shown removed from the drive impact tool "T". The magazine 10 is formed using commonly available materials which may be easily and inexpensively manufactured and supplied, and includes a housing 12 having proximal and distal ends 14 and 16, respectively. The housing 12 preferably has a cylindrical shape and includes an exterior wall 18 and an interior chamber 20 defined by a cylindrical interior wall 22. A cap 24 covers the proximal end 14 of the housing 12.

Figure 3:
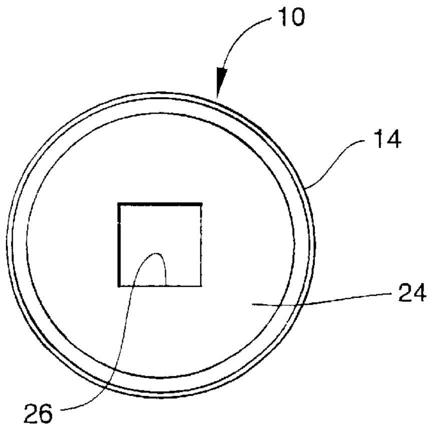
FIG. 3 is a plan view of the lug nut magazine taken along line 3—3 of FIG. 2.
Figure 6:
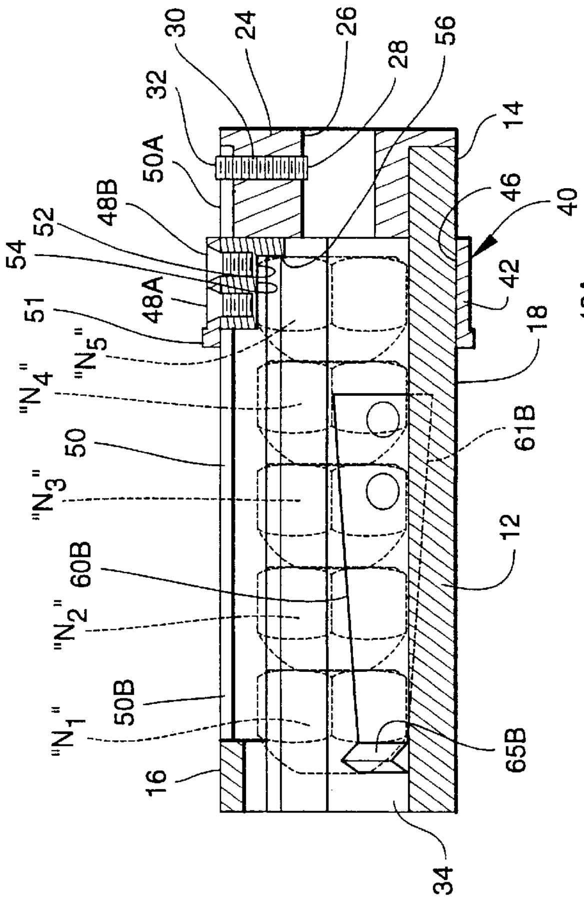
FIG. 6 is a cross-sectional view taken along line 6—6 of FIG. 4 showing the magazine fully loaded with lug nuts.

Referring now to FIG. 3, the cap 24 defines an opening 26 that is adapted for receiving the operating end of a drive impact tool. While the opening 26 shown in FIG. 3 has a generally square shape, the opening 26 may be any shape necessary for receiving the complementary-shaped shank of a drive impact tool. As is shown in FIGS. 6 through 6C, the opening 26 communicates with a passage 28 which is defined by and extends through the cap 24. The passage 28 opens into and communicates with the chamber 20 for permitting the operating end of the shank of a drive impact tool inserted through the passage 28 to engage the nut "$N_5$" positioned adjacent the upstream end of the chamber 20. A threaded hole 30 is defined by and extends through the housing 12. The hole 30 is positioned on the proximal end 14 of the housing 12 adjacent the cap 24. As is shown in FIGS. 6 through 6C, a complementary threaded allen screw 32 is positioned within and extends through the hole 30. The screw 32 may be loosened or tightened to respectively release or lock the shank in place within the passage 28.

Referring again to FIG. 2, the distal end 16 of housing 12 defines a port 34 which communicates with the chamber 20 to allow one or more nuts to be loaded into or dispensed from the chamber 20. While the magazine 10 is preferably cylindrically-shaped and has dimensions sufficient for permitting no more than five nuts "$N_1$", "$N_2$", $N_3$", "$N_4$", and "$N_5$", respectively, to be loaded into the chamber 20, the magazine 10 may alternatively be formed in any suitable shape and have any dimensions necessary to permit any number of nuts "N" of any size to be positioned within the chamber 20.

Figure 4:
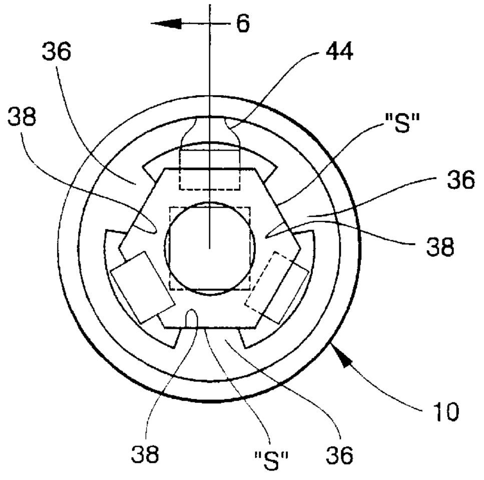
FIG. 4 is a plan view of the lug nut magazine taken along line 4—4 of FIG. 2.

Once inside the chamber 20, the nuts "$N_1$", "$N_2$", $N_3$", "$N_4$", and "$N_5$" are maintained in the sequential, axially-aligned position shown in FIG. 2 by three identically-shaped guides 36. Each guide 36 is attached to with the interior wall 22 and projects radially inwardly into the chamber 20. The guides 36 may alternatively be integrally formed with the interior wall 22. Each guide 36 includes a planar upper face 38 which extends along the length of the guide 36. As is shown in FIG. 4, the guides 36 are positioned in spaced-apart relation to each other on the interior wall 22 so that each upper face 38 may engage a respective one of the alternating sidewalls "S" of a hexagonally-shaped nut "N" positioned within the chamber 20. Orienting the guides 36 and upper faces 38 within the chamber 20 in this manner permits the faces 36 to act as stabilizing surfaces against which the respective alternating sidewalls "S" of a nut may slide for preventing the nuts to move out of axial alignment with the other nuts in the chamber 20 as the nuts are either received ilk within or dispensed from the chamber 20.

Referring again to FIG. 2, the magazine 10 also includes a dispensing assembly 40 for sequentially dispensing the nuts "$N_1$", "$N_2$", $N_3$", "$N_4$", and "$N_5$" from the chamber 20 through the port 34. The assembly 40 includes a displacer ring 42 which encircles and is carried on the exterior wall 18 of the housing 12. A displacer 44 is connected to an inner wall 46 of the displacer ring 42 and extends through an elongate slot 50 into the chamber 20, where the displacer 44 remains positioned adjacent the interior wall 22. The slot 50 is defined by and extends through the housing 12. The slot 50 also extends parallel to the longitudinal axis of the housing 12.

Figure 5:
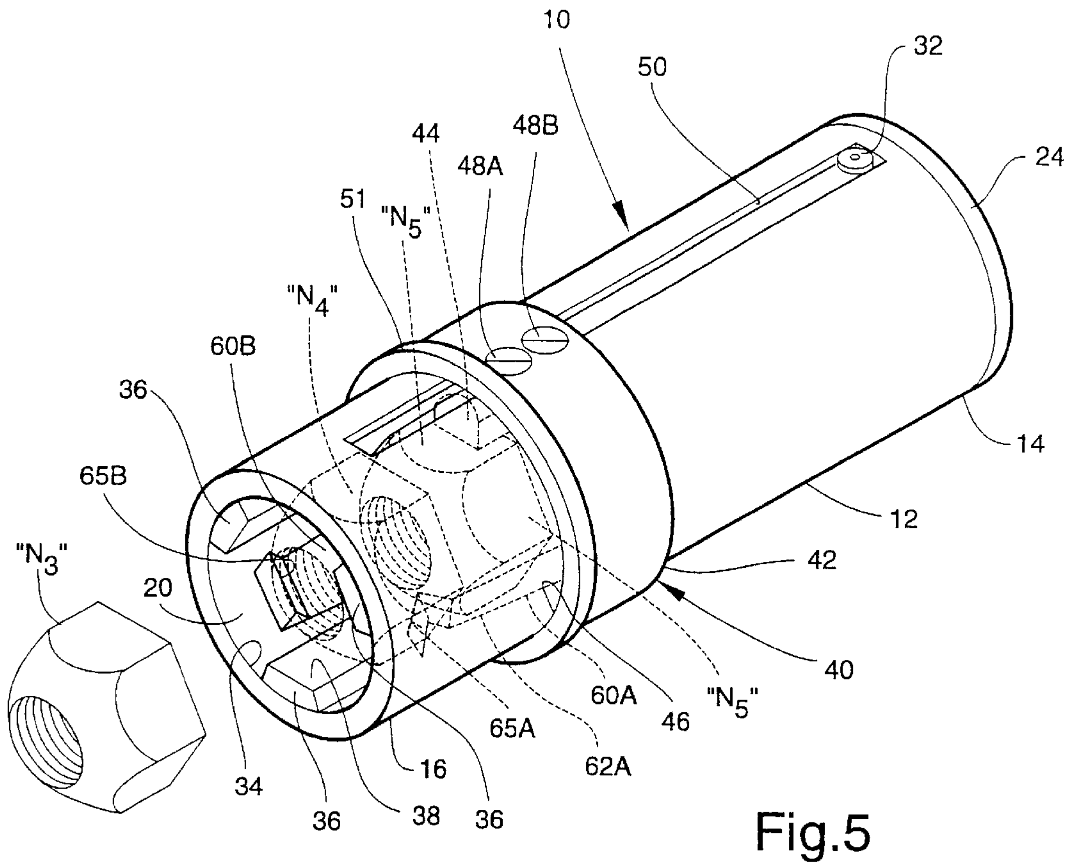
FIG. 5 is a perspective view of the lug nut magazine according to FIG. 2 showing the displacer ring in a nut-releasing position and with a lug nut ejected from the chamber.

As is shown in FIGS. 6 through 6C, two threaded screws 48A and 48B extend through the displacer ring 42 and into the displacer 44. The screws 48A and 48B maintain the displacer 44 in a stationary position relative to the displacer ring 42. Connecting the displacer 44 to the displacer ring 42 in this manner causes the displacer 44 to move within the chamber 20 in both the upstream and downstream direction along the length of the slot 50 in response to corresponding movement of the displacer ring 42 along the exterior wall 18 of the housing 12. FIG. 5 shows the displacer ring 42 after being moved in a downstream direction along the slot 50 and towards the port 34 for releasing the nuts therethrough.

The nuts "$N_1$", "$N_2$", $N_3$", "$N_4$", and "$N_5$" are pushed through the chamber 20 by the force exerted by a user on the displacer ring 42, which translates into a force on the displacer 44 which in turn moves the nuts "$N_1$", "$N_2$", $N_3$", "$N_4$", and "$N_5$" along the length of the chamber 20. As is shown in FIGS. 6 through 6C, an interior shoulder 52 is formed on the displacer 44 and is positioned inside the chamber 20. The shoulder 52 includes diverging faces 54 and 56. Faces 54 and 56 engage similarly-configured, adjacent faces of nut "$N_5$" which is positioned adjacent to the proximal end 14 of the housing 12 for ensuring not only that all of the nuts "$N_1$", "$N_2$", $N_3$", "$N_4$", and "$N_5$" remain in alignment as they are received within or discharged from the chamber 20, but also that nuts "$N_1$", "$N_2$", $N_3$", "$N_4$", and "$N_5$" each move smoothly through the chamber 20 and toward the port 34 in response to the corresponding movement of the displacer ring 42 and displacer 44.

Referring again to FIG. 2, the dispensing assembly 40 also includes first and second detent arms 60A and 60B, respectively (detent arm 60B is also shown in FIGS. 6 through 9). Although detent arms 60A and 60B may be formed from any suitable material, detent arms 60A and 60B are preferably formed from spring steel. Detent arms 60A and 60B each extend along the length of the chamber 20 and have anchoring ends 61A and 61B, respectively. Anchoring ends 61A and 61B are is connected to the interior wall 22 adjacent the proximal end 14 of the housing 12. Detent arms 60A and 60B also include free ends 62A and 62B, respectively, each of which extends in the downstream direction toward the distal end 16 of the housing 12. As shown in FIGS. 2 and 5, inwardly-protruding catches 64A and 64B are formed on free ends 62A and 62B, respectively. Catches 64A and 64B include respective angular faces 65A and 65B. Each face 65A and 65B engages a similarly-configured chamfered edge of a lug nut positioned immediately upstream and adjacent to catch 65A or 65B, respectively.

As is shown in FIG. 2, the anchoring end 61B of detent arm 60B is connected to interior wall 22 so that the free end 62B is biased away from the interior wall 22 and into the chamber 20, which in turn causes catch 64B to be oriented in a manner that permits the angular face 65B to engage the chamfered edge of the nut "$N_1$" positioned immediately adjacent to the port 34. The anchoring end 61A of detent arm 60A is connected to the interior wall 22 upstream from the location at which the anchoring end 61B of arm 60B is connected. This causes catch 64A to be positioned within the chamber 20 so that the angular face 65A engages the chamfered edge of nut "$N_2$" which is positioned immediately adjacent to and upstream from nut "$N_1$" that is positioned adjacent to the port 34.

Referring now to FIGS. 6, 6A, 6B, and 6C, the manner in which lug nuts are sequentially dispensed from the magazine 10 is illustrated. FIG. 6 shows the magazine 10 with the displacer ring 42 positioned at an upstream end 51A of the slot 50, and with lug nuts "$N_1$", "$N_2$", $N_3$", "$N_4$", and "$N_5$", respectively, loaded within the chamber 20. The nuts are held within the chamber 20 by detent arms 60A (see FIG. 2) and 60B. When the chamber 20 is fully loaded, angular face 65B engages the chamfered edge of nut "$N_1$", and angular face 65A engages the chamfered edge of nut "$N_2$" (See FIG. 2), which in turn holds all of the nuts in place within the chamber 20. In the absence of pressure against the displacer ring 42 toward the distal end 16 of the housing 12, detent arms 60A and 60B maintain the nuts in the loaded—or stored—position within the chamber 20.

Figure 6A:
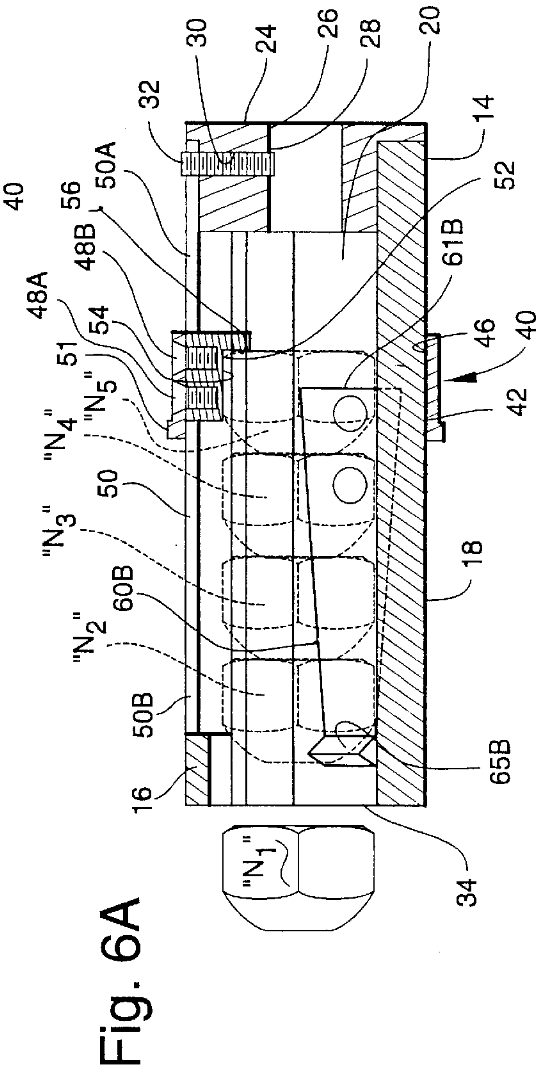
FIG. 6A is a cross-sectional view taken along line 6—6 of FIG. 4 showing the position of the displacer ring along the exterior of the magazine after a first lug nut has been dispensed from the chamber.
Figure 6B:
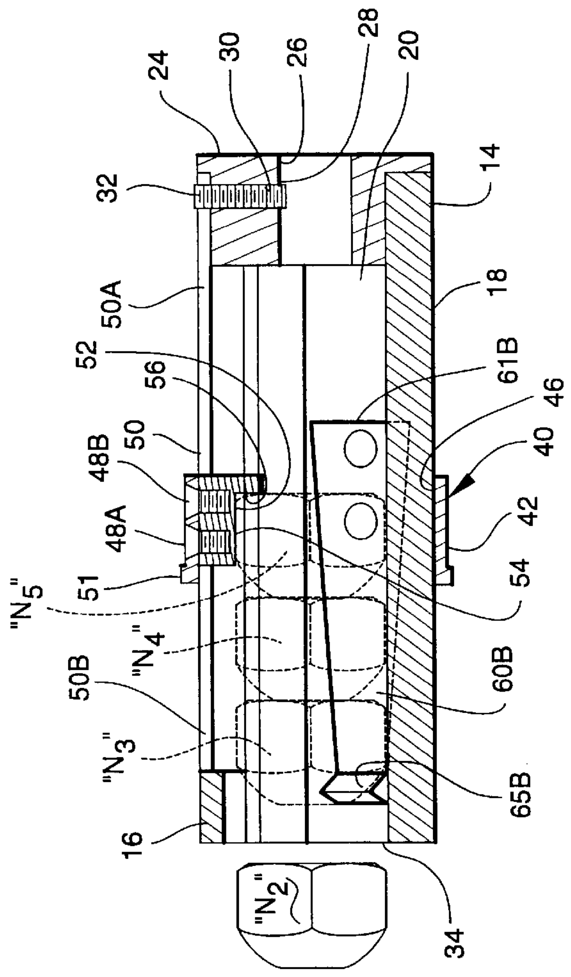
FIG. 6B is a cross-sectional view taken along line 6—6 of FIG. 4 showing the position of the displacer ring along the exterior of the magazine after a second lug nut has been dispensed from the chamber.
Figure 6C:
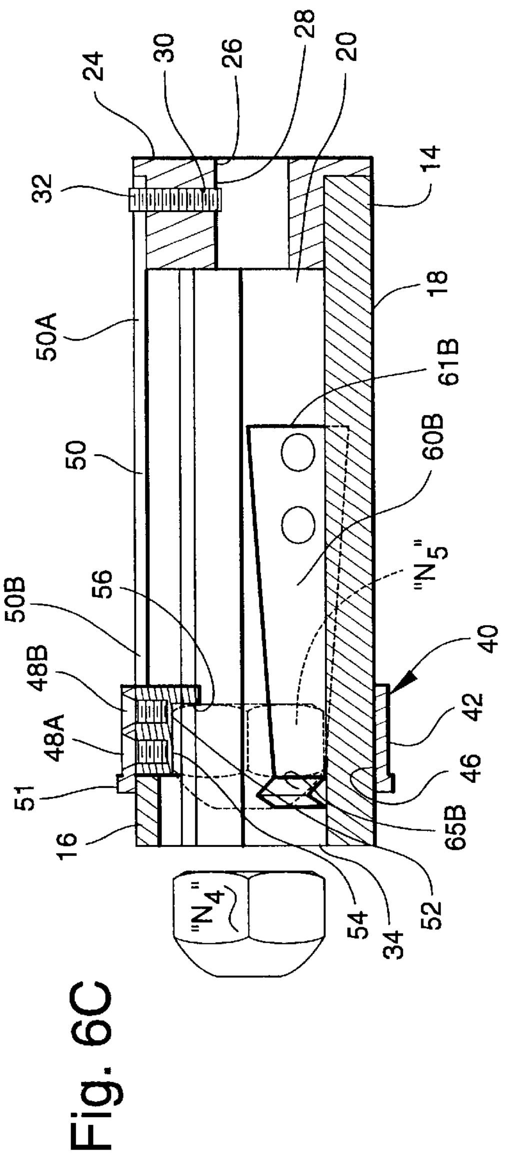
FIG. 6C is a cross-sectional view taken along line 6—6 of FIG. 4 showing the position of the displacer ring along the exterior of the magazine after a fourth lug nut has been dispensed from the chamber.

As is shown in FIG. 6A, to eject the first nut "N1" from the chamber 20, the dispenser ring 42 is moved along slot 50 toward distal end 16, which causes the shoulder 52 on the dispenser 44 to urge the nuts "$N_1$", "$N_2$", $N_3$", "$N_4$", and "$N_5$" toward the distal end 16. This in turn causes nut "$N_1$" to press against angular face 65B, and nut "$N_2$" to press against angular face 65A (See FIG. 2). The force of nuts "$N_1$" and "$N_2$" on faces 65B and 65A, respectively, causes respective free ends 61A and 61B to move toward the interior wall 22, which permits nut "N1" to pass over catch 64B, through the port 34 and out of the magazine 10. Nut "$N_2$" simultaneously travels over catch 64A and into the position previously occupied by nut "$N_1$". As is shown in FIGS. 6B and 6C, this process may be repeated for dispensing the remaining nuts from the chamber 20 until only one nut "N5" remains.

While FIGS. 6, 6A, 6B, and 6C show the dispenser ring 42 being moved in increments along the length of slot 50 so that nuts "$N_1$", "$N_2$", $N_3$", "$N_4$", and "$N_5$" are dispensed from the magazine 10 one at a time, the displacer ring 42 may alternatively be moved from the upstream end 50A to the downstream end 50B of slot 50 in a single, continuous motion, which will cause nuts "$N_1$", "$N_2$", $N_3$", "$N_4$", and "$N_5$" to be rapidly moved in sequence over the free ends 61A and 61B, respectively, and ejected through the port 34 and out of the housing 12.

A lug nut dispenser is described above. Various details of the invention may be change without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A lug nut dispenser adapted for use with a drive impact tool for mounting and removing a plurality of lug nuts from a wheel hub, comprising:

(a) a housing including:

(i) interior and exterior walls, said interior wall defining an elongate chamber adapted for receiving the lug nuts therein;

(ii) an upstream end of the housing adapted for releasably receiving the drive impact tool; and (iii) a downstream end of the housing defining a port communicating with said chamber for permitting consecutive release and ejection of the lug nuts therethrough;

(b) a displacer ring carried on said exterior wall of the housing and adapted for sliding movement relative thereto;

(c) a displacer connected to said displacer ring and extending through a slot defined by and extending through the housing and into the elongate chamber, said displacer adapted for sliding movement along said slot relative to the chamber for moving the nuts in a downstream direction in response to movement of the displacer ring, and including a radially and inwardly-extending shoulder for engaging adjacent radially and inwardly-extending faces of a nut positioned in the chamber for providing a first stabilizing surface for permitting sequential, axially-aligned movement of the nuts through the chamber;

(d) at least two spaced-apart, flexible detent arms, each of said detent arms including:

(a) a first end connected to the interior wall; and (b) a second end extending away from the first end and toward the downstream end of the housing, said second end including an inwardly-extending tip and movable between:

(i) a nut-retaining position wherein said inwardly-extending tip engages and retains the nut within the chamber in the absence of movement of the nuts toward the downstream end; and (ii) a nut-dispensing position, wherein the dispenser urges the nuts toward the downstream end to cause the second end of the detent arm to move away from the nut positioned adjacent the downstream end, thereby releasing the nut and allowing ejection of the nut through the port.

2. A lug nut dispenser according to claim 1, and including at least one inwardly-projecting guide positioned on said interior wall and extending along the length of the chamber between the downstream and upstream ends of the housing, said guide adapted for engaging a complementary side of the nut and providing a second stabilizing surface for permitting the sequential, axially-aligned movement of the nuts through the chamber.

3. A lug nut dispenser according to claim 1, and further comprising a plurality of spaced-apart, inwardly-projecting guides positioned on said interior wall and extending along the length of the chamber between the downstream and upstream ends of the housing, each of said guides adapted for engaging a respective one of a plurality of complementary sides of the nut and cooperating together for collectively providing a second stabilizing surface for permitting the sequential, axially-aligned movement of the nuts through the chamber.

4. A lug nut dispenser according to claim 3, wherein said plurality of inwardly-projecting guides comprises an odd number of inwardly-projecting guides.

5. A lug nut dispenser according to claim 4, wherein said odd number of inwardly-projecting guides comprises three inwardly-projecting guides.

6. A lug nut dispenser according to claim 1, 2, or 3, wherein said first end of each of the detent arms is connected to the interior wall adjacent said upstream end of the housing.

7. A lug nut dispenser according to claim 1, and including a radially and outwardly-extending flange formed on a downstream edge of the displacer ring for permitting a user to grasp the displacer ring for urging the displacer ring in the downstream direction, thereby initiating the sequential, axially-aligned movement of nuts through the chamber.

8. A lug nut dispenser according to claim 1, wherein said inwardly-extending tip defines a notch having an inwardly-directed face biased toward and engaging the nut positioned adjacent the downstream end of the housing in the absence of movement of the nuts toward the downstream end.

9. A lug-nut dispenser according to claim 1, or 8, wherein each of said detent arms comprises spring steel.

* * * * *